United States Patent [19]

Holdenried

[11] Patent Number: 4,463,559
[45] Date of Patent: Aug. 7, 1984

[54] HYDROSTATIC TRANSMISSION WITH INCHING CONTROL

[75] Inventor: Willy Holdenried, Friedrichshafen, Fed. Rep. of Germany

[73] Assignee: Zahnradfabrik Friedrichshafen, A.G., Friedrichshafen, Fed. Rep. of Germany

[21] Appl. No.: 314,436

[22] Filed: Oct. 23, 1981

[30] Foreign Application Priority Data

Oct. 25, 1980 [DE] Fed. Rep. of Germany ....... 3040321

[51] Int. Cl.³ ............................................. F16D 31/02
[52] U.S. Cl. .................................. 60/444; 137/625.17; 137/625.3
[58] Field of Search ................. 60/443, 444, 447, 445; 137/625.17, 625.3; 251/209

[56] References Cited

U.S. PATENT DOCUMENTS

| | | | |
|---|---|---|---|
| 3,186,162 | 6/1965 | Pignolet et al. | 60/444 X |
| 3,187,775 | 6/1965 | Pinnell | 137/625.3 |
| 3,297,051 | 1/1967 | Church et al. | 137/625.17 |
| 4,075,841 | 2/1978 | Hamman et al. | 60/444 |
| 4,188,789 | 2/1980 | Hamma | 60/444 |

FOREIGN PATENT DOCUMENTS 2601226 7/1977 Fed. Rep. of Germany .

Primary Examiner—Edward K. Look
Attorney, Agent, or Firm—Karl F. Ross; Herbert Dubno

[57] ABSTRACT

A hydrostatic transmission between a prime mover and a load, e.g. for driving an automotive vehicle, especially an automotive vehicle requiring a high degree of maneuverability such as a fork lift truck, comprises a reversible-output variable displacement pump connected to a motor which, in turn, drives the load. The control element of the pump is operated by a hydraulic piston-and-cylinder arrangement biased into a neutral position between positions of forward and reverse operation of the pump and pressurization of the oppositely effective chambers in this arrangement is controlled by a pedal-operated "inch" valve whose flow cross section progressively increases with pedal actuation and controls the return of the pressure medium to the reservoir. The valve is designed so that even when the prime mover operates at high speed, starting movements of the pedal provide sensitive movement of the vehicle.

6 Claims, 8 Drawing Figures

HYDROSTATIC TRANSMISSION WITH INCHING CONTROL

FIELD OF THE INVENTION

My present invention relates to a hydrostatic transmission and, more particularly, to a hydrostatic transmission with inching control.

BACKGROUND OF THE INVENTION

A hydrostatic transmission for automotive vehicle and other load-operating applications can comprise a hydraulic (hydrostatic) motor connected to a load such as the driving wheels of a vehicle, a variable-displacement reversible hydraulic (hydrostatic) pump connected to a prime mover such as the internal combustion engine of the vehicle, a hydraulic circuit connecting the pump and the motor so that the direction of rotation of the motor is a function of displacement of a control element of the pump to one side or to the other side of a null or neutral position and the speed of the motor is a function, for a given speed of the prime mover, of the degree of displacement of the control element from its null position, and a piston-and-cylinder arrangement for actuating the control element.

Frequently a control-pressure pump is also connected to the prime mover for developing the fluid pressure of a control medium which is applied to one side (compartment) or the other side (compartment) of the latter arrangement to displace the movable member thereof from its null position one or the other direction.

The movable member is generally spring centered in its null position and means can be provided for controlling the pressure in the two compartments, e.g. to selectively reduce the control pressure in one compartment, to effect displacement of the control member of the piston and cylinder arrangement which thus functions as a servocylinder, control cylinder or regulating cylinder.

In German patent document (open application) DE-OS No. 26 01 226, the control piston has a rod enabling manual operation which is difficult to control.

In practice, moreover, high pedal forces are found to be required to operate the control cylinder so that the control mechanism suffers undue wear. In addition, the pedal mechanism is subject to failure which makes emergency stops impossible.

Finally, extremely fine control of the output of the transmission is not possible with this earlier system especially if the prime mover or engine is operating at high speeds which would result in high fluid displacement by the pump upon movement of the control element for its null position. Such fine control of the transmission is a requirement for many types of vehicles, for example so-called industrial floor vehicles, e.g. fork lift trucks which frequently must be maneuvered very slowly to bring them into load-pickup and load-depositing positions.

OBJECTS OF THE INVENTION

It is the principal object of the present invention to provide a control system for a hydrostatic transmission of the aforedescribed type which is effective even when the drive motor (engine or prime mover) is operating at high speed, to enable fine control and maneuverability of the load (vehicle) even at the beginning of pedal actuation.

Another object of the invention is to provide a transmission of the type described which enables progressive control of the maneuverability of the vehicle over the entire range of displacement of the pedal but with especially fine control at the beginning of this displacement where the input to the hydrostatic pump is operating at a high rate of speed.

SUMMARY OF THE INVENTION

These objects and others which will become apparent hereinafter are attained, in accordance with this invention, in a hydrostatic transmission between a prime mover and a load which comprises a reversible-output variable displacement pump connected to the prime mover, a hydrostatic motor hydraulically connected to the pump and operatively coupled to the load, a control cylinder having a control piston spring biased into a null position within the cylinder and pressurizable compartment on either side of the piston which is connected to a control element of the pump displaceable from its null position to either side to select the direction of displacement of the motor, and means for selectively pressurizing one of the compartments while depressurizing the other to elect the direction in which said element is shifted from its null position. The transmission also includes a control pedal whose actuation determines the degree to which the control element is shifted from its null position.

According to the invention, a control-fluid pump is provided to generate the fluid pressure applied to said compartments and an inch valve actuated by the pedal is connected to the pressure side of the larger pump and defines a flow cross section which varies depending upon the degree of displacement of the pedal and drains into a fluid return path.

The flow cross section between the pressure side of the pump and the return path thus varies as a function of the displacement of the pedal.

An inch valve has its flow cross section determined as a function of the displacement of the pedal and hence of the displacement of a movable member of this valve so that, even with high speeds of the engine and hence of the input shaft of the hydrostatic pump and of the control pump, the displacement of the control element of the hydrostatic pump is effected extremely sensitively at the start of pedal movement and hence at the beginning of any displacement of the control element from its null position.

As a result, even at high speeds of the engine, the vehicle may travel at low speeds and can be completely braked from high speeds with forces applied to the inch valve which are minimal since they are equal only to friction of this member and the pedal mechanism.

Another advantage of the system of the invention is that a small amount of space is required for the control device and operational safety is improved because extremely low forces are required for the inch valve so that the operator can exert sufficient force to displace the latter even if he happens to be in a weakened state.

Preferably the inch valve has an axially elongated construction and comprises a sleeve and a rod or shaft extending into the sleeve and forming the displaceable member.

The sleeve can be formed with supply and return ports and a leading edge which partially delimits the return port. The shaft can have an annular groove aligned with the supply port and one or more recesses hydraulically connected to the annular groove and extended into the region of the aforementioned edge.

It has been found to be advantageous in one embodiment of the invention to actuate the shaft by rotating it relative to the sleeve. Alternatively the shaft or rod may be axially displaced with respect to the sleeve.

It has been found to be advantageous moreover to form the aforementioned edge as a helical flank or center on the envelope of the sleeve and at least one of the processes can be provided as a control groove with a cross section tapering away from the annular groove mentioned previously. As will be described in greater detail below, it has also been found to be advantageous to provide a bypass in the shaft in addition to the control groove.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
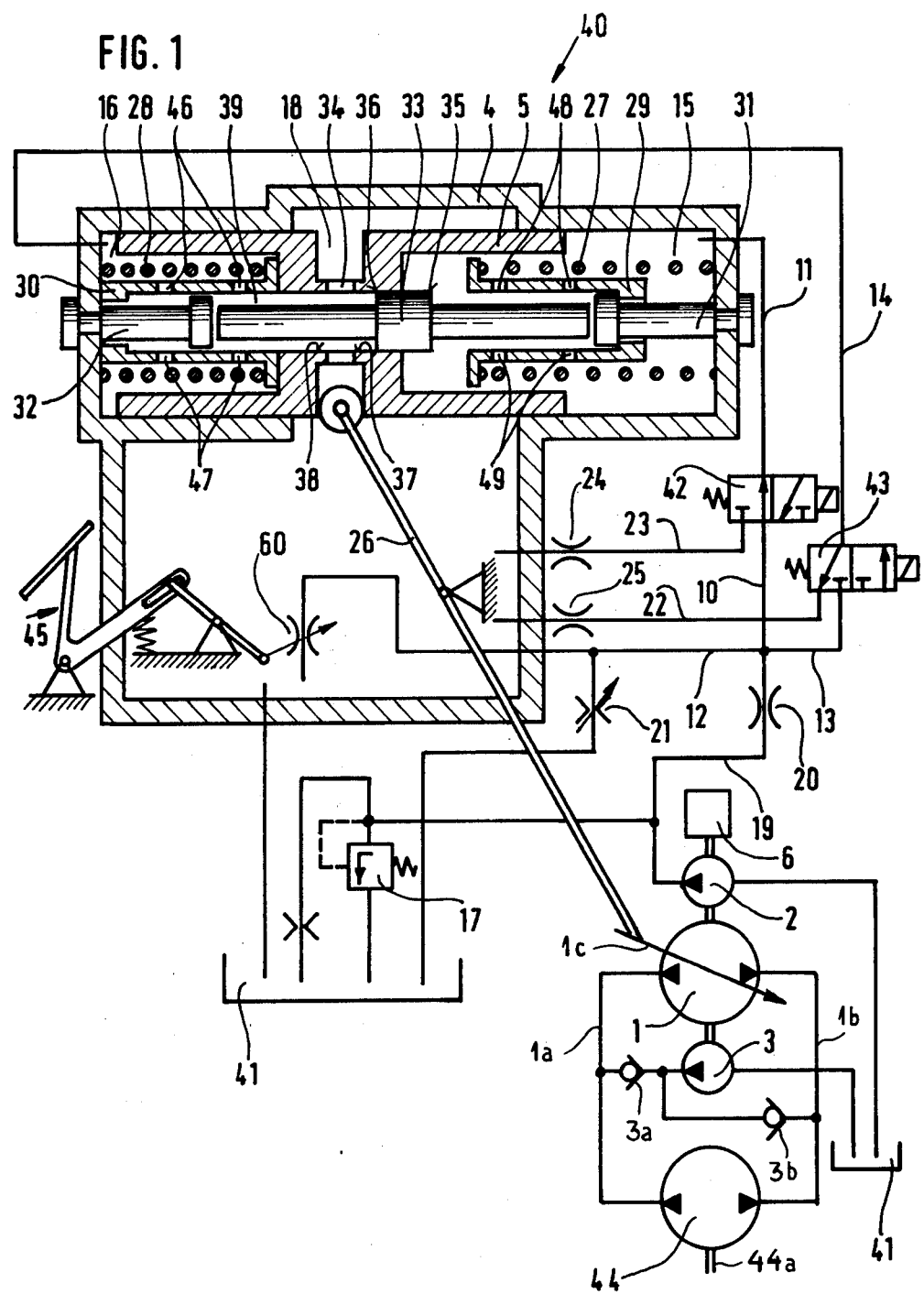
FIG. 1 is an axial section through a servocylinder and a diagram showing the control device of the invention with the control piston in a position in which it is shifted from its null position and has entrained the control element of the hydrostatic pump out of its null position as well.

The transmission of the invention can be utilized in a fork lift truck to drive the driven wheels of the latter and the fork lift truck may have a prime mover or drive motor perhaps in the form of an internal combustion engine or an electric motor which has its output shaft connected to a control pressure pump 2, to a variable displacement reversible hydrostatic pump 1 and to a supply pump 3.

The pump 1 has its hydraulic lines 1a and 1b connected to the ports of a hydrostatic motor 44 whose output shaft 44a is connected to the load, namely the driving wheels of the vehicle.

The make-up pump 3 draws fluid from the reservoir 41 and feeds it via check valves 3a and 3b to a hydraulic circuit 1a, 1b to compensate for fluid leakage from the hydrostatic transmission.

The pump 1 has a control element 1c, e.g. a swash plate, which can be tilted to either side of a null or neutral position to vary the output direction of the pump 1 and hence the direction of drive of the vehicle. The degree of this displacement from the null position, of course, controls the speed of the vehicle. The control circuit is represented at 40 and serves to operate the control element of pump 1.

The control device acts via a control rod 26 and comprises an adjustment piston 5 which is disposed in an axially displaceable manner in an adjustment cylinder 4 and is provided with a radial groove 18 located in the center of the piston.

By means of two oppositely disposed compression springs 27, 28 which are guided by means of bores 46, 47 and 48, 49 provided with spring sleeves 29, 30 and which act upon—disposed on the right-hand and left-hand sides respectively in FIG. 1—the base of the adjustment piston 5 formed as a double piston, the base is firstly centered in a neutral, null or central position and may be shifted from this position in both directions.

In FIG. 1 the adjustment piston 5 is shown shifted to the left in a particular operating condition. This operating condition will be explained below in further detail.

Two oppositely disposed stop elements 31, 32 which are rigid with respect to the housing serve to center or lock in the neutral or central position corresponding to the adjustment piston 5, an axially fixed valve piston 33 guided in a central bore 39 of the adjustment piston 5.

The valve piston 33 is arranged in such a way with respect to the adjustment piston 5 that a greater or lesser cross-section of an aperture 34 is exposed in the middle of the adjustment piston 5 according in each case to its deflection via its leading edges 37, 38 and the leading edges 35, 36 of the valve piston 33 thereby providing a connection from one of the pressure chambers 15 and 16 to a pressure medium return 41. The opposite pressure chambers 15 and 16 of the adjustment cylinder 4 are connected to two directional control valves 42 and 43 via lines 11 and 14, the directional control valves being formed in the embodiment as 3/2 (three-part, two-position) directional control valves.

Figure 2:
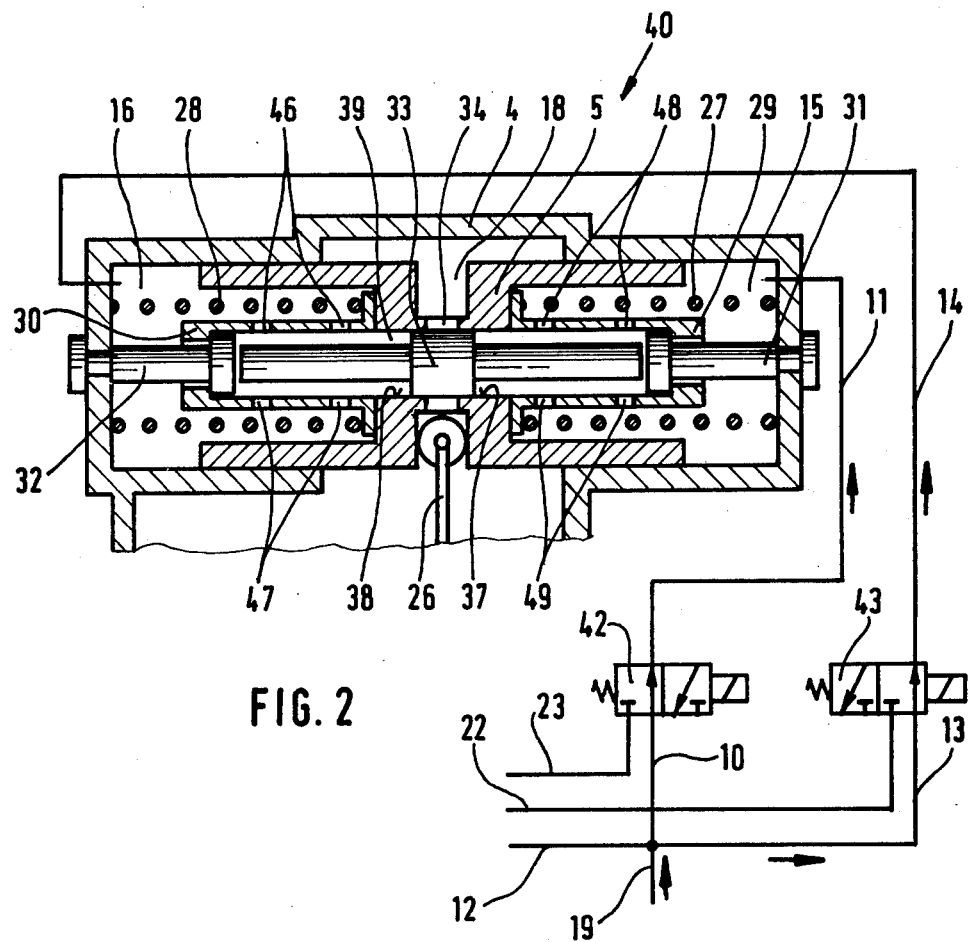
FIG. 2 is a partial section and diagram corresponding to FIG. 1 in the null position.

When the vehicle is at rest the directional control valves 42, 43 are positioned as in FIG. 2. In this respect the same pressures are produced in the pressure chambers 15, 16, as both are acted upon by pressurized fluid, the effects of these pressures canceling each other out via the adjustment piston 5. The adjustment piston 5 is not shifted.

If the vehicle is required to move forward, the directional control valves 42, 43 must be in the position shown in FIG. 1. The control pump 2 is in this respect only connected with the pressure chamber 15 of the adjustment cylinder 4 via lines 10, 19, the directional control valve 42 and the line 11, while the opposite pressure chamber 16 is connected via the line 14, the directional control valve 43 and a return line 22.

When the speed of the drive motor 6 increases, the speed of the control pump also increases and therefore there is an increase of the pressure in the pressure chamber 15. The adjustment piston 5 is deflected by the compression of the compression spring 28.

As a result the aperture 34 is further opened to the pressure medium return 41 for the pressure chamber 16 which is already connected to the pressure medium return 41 via the line 14 and a throttle 25. The displacement of the adjustment piston 5 may therefore be carried out in a similar manner to the above control pressure. The fluid does not prevent the adjustment movement of the adjustment piston 5.

For example in the case of a fork-lift truck the drive motor 6 must have a high speed for a high lifting speed. In this respect it must however be possible to maneuver the vehicle slowly. This process is known as "inching".

An inch valve 60 is actuated by a pedal 45 (FIG. 1), which inch valve has its supply connected via a line 12 to the lines 10, 19 on the pressure side and its outlet leading to the pressure medium return 41. Depending on the course of the pedal 45 the control pressure is reduced and the vehicle speed decreased. In this way it is possible for the vehicle to move very slowly despite the high speed of its drive motor 6.

Figure 3:
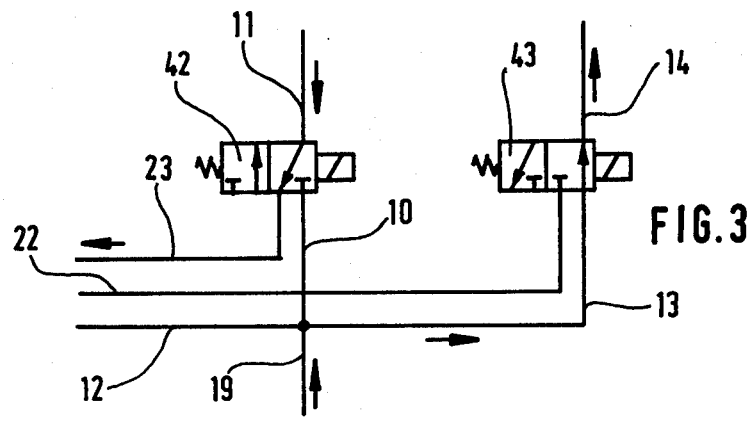
FIG. 3 is a diagram showing the directional control valves of FIG. 2, one of which has been reversed in position with respect to its position in FIG. 2.

If it is desired to reverse the direction of travel of the vehicle from the forward direction, the directional control valves 42, 43 are brought into the position shown in FIG. 3. The pressure chamber 16 of the adjustment cylinder 4 is then connected with the control pump 2 via the line 14, the directional control valve 43, a line 13, a throttle 20 and the line 19.

At the same time the pressure chamber 15 of the adjustment cylinder 4 is connected with the pressure medium return 41 via the line 11, the directional control valve 42, a return line 23 and a throttle 24. No pressure may therefore be provided in the pressure chamber 16 as it is connected with the pressure medium return 41 via the aperture 34. Repositioning takes place independently of this by means of an accumulator.

Repositioning to the neutral or central position of the adjustment piston 5 in the adjustment cylinder 4 takes place solely as a result of the power stored in the compressed compression spring 28 as it is not possible to establish any pressure in the pressure chamber 16 on account of the aperture 34 which is released.

Damped repositioning of the adjustment piston 5 is achieved via the throttle 24 which is used as a damping element. After the neutral or central position of the adjustment piston 5 in the adjustment cylinder 4 has been achieved or exceeded the connection of the pressure chamber 16 with the pressure medium return 41 via the aperture 34 is discontinued by the valve piston 33, so that pressure may now be established in the pressure chamber 16 and the adjustment piston 5 is now adjusted as a function of the pressure present in the pressure chamber 16.

"Inching", i.e. a slow maneuvering of the vehicle, is also possible in this operating condition by actuation of the pedal 45 and corresponding adjustment of the inch valve 60, wherein according to the extent of the actuation of the inch valve 60 the control pressure on the lines 12, 13, 14 may be decreased to almost zero. It is also possible in this respect for the vehicle to move very slowly even if its drive motor 6 has a high speed.

In the device of FIG. 1 a filling pressure limiting valve 17 is provided on the pressure side in the line 19 of the control pump 2. The throttle 20 inserted in the path of the line 19 stabilizes the pressure medium flow coming from the control pump 2. Viewed from the control pump 2 there is provided an adjustable throttle 21 downstream of the throttle 20, which throttle 21 enables an accurate pressure adjustment in the lines 10, 12, 13 and therefore in the lines 11, 14 leading into the pressure chambers 15, 16.

Figure 4:
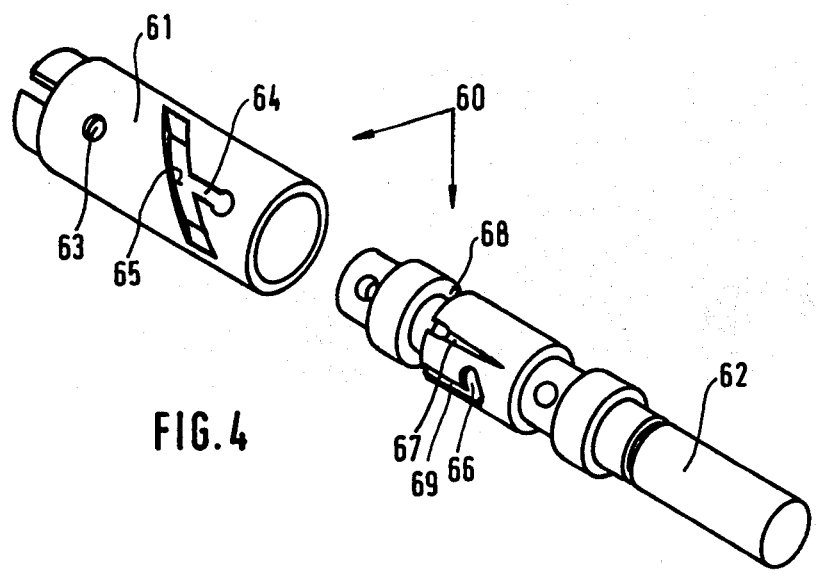
FIG. 4 is an exploded view of the inch valve, showing the sleeve and shaft thereon disassembled.

The structural design of the inch valve 60 is shown in the first instance in FIG. 4. A cylindrical sleeve 61 is provided with a supply 63 and an outlet 64. The latter also comprises a helically disposed, rectilinear slot with a leading edge 64 which covers a segment of the envelope of the sleeve. A shaft 62 which extends coaxially into the sleeve 61 comprises an annular groove 68, a control groove 66 and a control groove 67.

Figure 5:
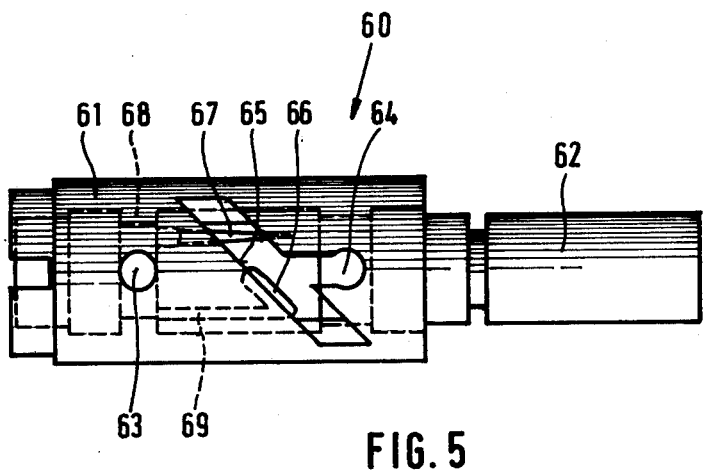
FIG. 5 is an elevational view drawn to a larger scale of the assembled inch valve.

When the inch valve (FIG. 5) is mounted the annular groove 68 of the shaft 62 is covered with its supply 63 in the sleeve 61.

A duct 69 leads away from the annular groove 68 in an axial direction to the shaft 62 and communicates with the control groove 66, which—in the same way as the leading edge 65 on the sleeve—includes a helical segment of the shaft.

The control groove 67—parallel to the duct 69 in the embodiment—extends also from the annular groove 68 of the shaft 62 in an axial direction. The end of the control groove 67 is thus tapered both with respect to its width and its depth.

If the shaft 62 is rotated with respect to the sleeve 61, greater or lesser areas of the control groove 66 and/or the control groove 67 appear adjacent to the leading edge 65 in the return 64.

A throughflow cross-section which varies in size as a function of the relative rotation of the shaft 62 and the sleeve 61 may therefore be released from the supply 63 to the return 64. As a result of the particular formation of the bypass 66 and the control groove 67 it is in addition possible to provide a determined characteristic of the throughflow cross-section through the inch valve 60 which is released to a greater or lesser extent during relative movement.

Figure 6:
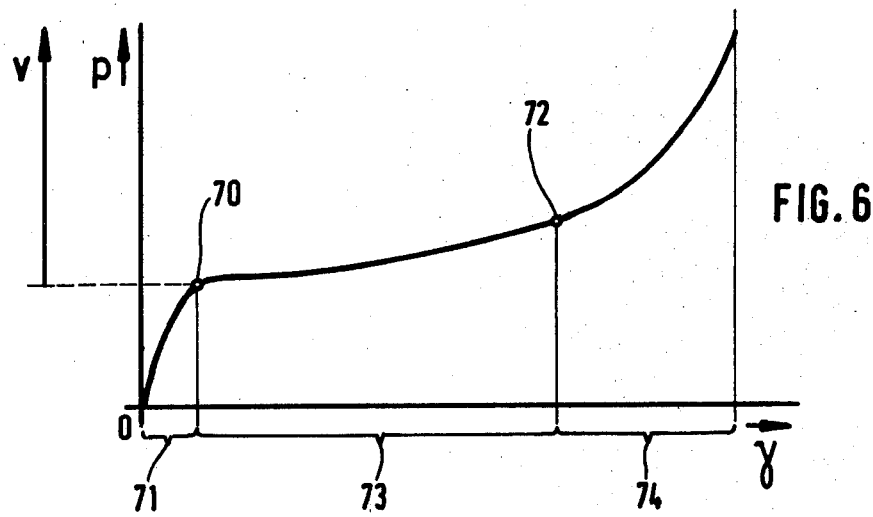
FIG. 6 is a graph illustrating the dependency of the angle of rotation of the inch shaft on the adjustment pressure in a corresponding department of the control cylinder.

FIG. 6 shows the dependency of the adjustment pressure p and the vehicle speed v as a function of the angle of rotation $\gamma$ between the shaft 62 and the sleeve 61. In accordance with the diagram although the adjustment pressure in the pressure chamber 15 of the adjustment cylinder 4 increases within an area 71 despite rotation of the shaft 62 with respect to the sleeve 61, i.e. the actuation of the inch valve 60, the speed v is zero up to a starting point 70. The vehicle is therefore at rest within the area 71.

From the starting point 70 to a point 72, i.e. in an area 73, the adjustment pressure p increases relatively slowly in the pressure chamber 15 of the adjustment cylinder 4—in comparison to the angle of rotation $\gamma$ of the shaft 62 with respect to the sleeve 61 of the inch valve 60. Area 73 therefore represents an inching area with small progression. From point 72 the curve extends more steeply. This means that an area 74 is an area of travel with a greater progression, i.e. a relatively low rotation of the shaft 62 with respect to the sleeve 61 of the inch valve 60 causes a relatively high increase of the adjustment pressure p and therefore the vehicle speed v.

At the beginning of actuation the inch valve 60 handles very sensitively, as a relatively high pedal course causes slight changes of the adjustment pressure p in the pressure chamber 15 of the adjustment cylinder 4 and therefore a slight change in the speed of the vehicle.

Figures 7, 8:
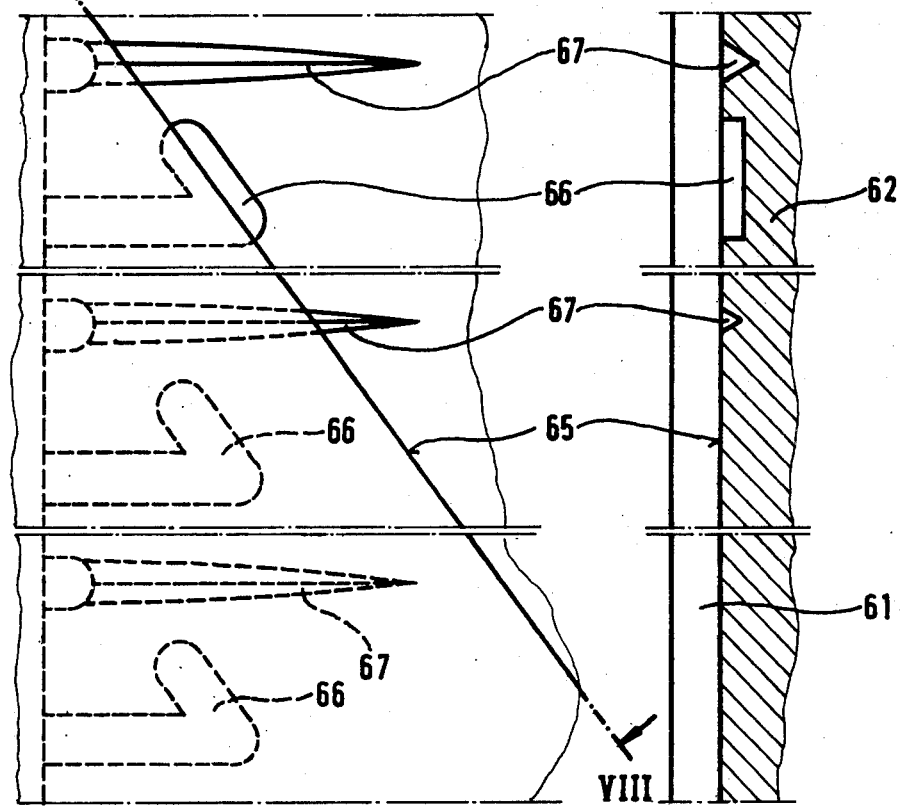
FIG. 7 is a diagram representing the control groove and bypass of the shaft of the inch valve with respect to a plane representing the position and corresponding to the section plane VIII—VIII, this plane also representing the location of the sleeve edge.
FIG. 8 is a section along the line VIII—VIII showing the flow cross sections which pertain in the various positions represented at the top, center and bottom of FIG. 7.

FIG. 7 shows three angles of rotation $\gamma$ of the shaft 62 with respect to the sleeve 61 of the inch valve 60, wherein the area around the leading edge 65 plays a part.

In the upper portion, only part of the control groove 66 is covered by the continuous envelope of the sleeve 61 from the leading edge 65, whereas the predominant portion of the control groove is connected with the return 64. In the central portion the control groove 66 is completely covered by the envelope of the sleeve 61 and only a small partial area of the control groove 67 is within the area of the return 64. In the lower portion the control groove 67 is also completely covered by the envelope of the sleeve 61, as a result of which complete pressure in the pressure chamber 16 of the adjustment cylinder may be effective. This signifies maximum vehicle speed.

FIG. 8 shows the three conditions of FIG. 7 in cross-section through the sleeve 61 and the shaft 62. It can be seen from this that the depth of the control groove 67 also decreases in the direction of its narrow end.

I claim:

1. In a hydrostatic transmission having a variable displacement reversible output hydrostatic pump connected to a prime mover and formed with a control element displaceable to opposite sides of a null position to select the output direction of the transmission and controlling the speed of the output as a function of the degree of displacement of the control element from its null position, a hydrostatic motor connected in a hydraulic circuit with said hydrostatic pump and driving a load, a control pump driven by said prime mover, a control cylinder having a control piston spring biased into a null position and defining compartments on opposite sides of said piston pressurizable by said control pump, said piston being operatively connected to said element and a pedal, the improvement which comprises the combination therewith of:

an inch valve having a movable member operatively connected to said pedal and defining a flow cross section communicating between a pressure side of said control pump and a fluid return path and corresponding to the extent of displacement of said pedal, thereby enabling fine control of the position of said element even at high speeds of said prime mover at least upon initial displacement of said pedal, said inch valve comprising a sleeve formed with a supply port connected with said pressure side of said control pump, a return port connected with said return path, and a control edge partly delimiting said return port, and a shaft displaceable in said sleeve and operatively connected to said pedal, said shaft being formed with an annular groove communicating with said supply port and at least one control groove extending from said annular groove to the region of said edge and defining a variable flow cross section with said edge.

2. The improvement defined in claim 1 wherein said control groove tapers away from said annular groove.

3. The improvement defined in claim 2 wherein said edge is formed as a helical sector on said sleeve.

4. The improvement defined in claim 1, claim 2 or claim 3 wherein said shaft is rotatable in said sleeve by said pedal.

5. The improvement defined in claim 1, claim 2 or claim 3 wherein said shaft is axially displaceable in said sleeve by said pedal.

6. The improvement defined in claim 1, claim 2 or claim 3 wherein said shaft is further provided with a second control groove spaced from the first-mentioned control groove.

* * * * *